United States Patent [19]

Manent et al.

[11] Patent Number: 5,000,228

[45] Date of Patent: Mar. 19, 1991

[54] INSULATION SLEEVING

[75] Inventors: Jordi R. Manent; Ernest V. Montagut, both of Barcelona, Spain

[73] Assignee: Relats, S.A., Spain

[21] Appl. No.: 232,805

[22] Filed: Aug. 16, 1988

[30] Foreign Application Priority Data

Mar. 8, 1988 [ES] Spain .................................. 8801239

[51] Int. Cl.⁵ ............................................. F16L 11/08
[52] U.S. Cl. .................................... 138/124; 138/110; 138/118; 138/125; 138/126; 87/9; 428/36.1
[58] Field of Search ............... 138/124, 125, 126, 127, 138/110, 103, 123, 118; 87/9; 139/387 R; 174/121 R, 121 AR, 121 SR, 124 R, 124 GC; 428/35.7, 36.1, 246

[56] References Cited

U.S. PATENT DOCUMENTS

| | | | |
|---|---|---|---|
| 2,041,950 | 5/1936 | Pierce | 138/123 |
| 2,211,478 | 8/1940 | Pierce | 87/9 |
| 2,238,058 | 4/1941 | Johnson et al. | 138/123 |
| 2,471,116 | 5/1949 | Newberger | 87/9 |
| 2,836,181 | 5/1958 | Tapp | 138/123 |
| 4,005,234 | 1/1977 | Stroupe | 138/127 |
| 4,420,018 | 12/1983 | Brown | 87/9 |
| 4,452,279 | 6/1984 | Atwell | 138/110 |
| 4,600,615 | 7/1986 | Hyodo et al. | 428/246 |
| 4,679,599 | 7/1987 | Newberry et al. | 138/124 |
| 4,723,579 | 2/1988 | Hyodo et al. | 138/125 |
| 4,738,339 | 4/1988 | Taylor | 138/31 |
| 4,754,685 | 7/1988 | Kite et al. | 138/123 |
| 4,862,922 | 9/1989 | Kite | 138/123 |
| 4,877,665 | 10/1989 | Higuchi et al. | 138/124 |

Primary Examiner—James E. Bryant, III
Attorney, Agent, or Firm—Steinberg & Raskin

[57] ABSTRACT

Insulation sleeving, such as for providing thermal and/or electrical insulation for cables and cable connections, of the type comprising an inner sleeve of woven synthetic organic or inorganic fiber, such as fiberglass, and an outer coating of silicone elastomer. The woven fiber of the inner sleeve has a substantially open weave, i.e., the number of picks per centimeter is in the range of between about 2 and 9, and the silicone elastomer of the outer coating has a reduced modulus of elasticity, such as between about 0.5 and 3.5 MPa at 100 percent elongation, and an increased tear strength, such as between about 5 and 45 KN/m. Insulation sleeving is elastically expandable to an extent such that its diameter can be increased up to twice its original unexpanded dimension without materially affecting the thermal, electrical and mechanical insulation properties of the sleeving thereby enabling a standard sized sleeving, i.e., a sleeving having a certain uniform diameter, to be used in insulating any object having a substantially uniform diameter which is substantially equal to or up to twice the unexpanded diameter of the insulation sleeving. The insulation sleeving is also useful in insulating a region which presents an abrupt dimensional discontinuity, such as a cable connection.

2 Claims, 1 Drawing Sheet

INSULATION SLEEVING

BACKGROUND OF THE INVENTION

This invention relates generally to insulation sleeving, such as for providing thermal, electrical and/or mechanical protection, and more particularly, to insulation sleeving of the type comprising an inner sleeve of woven synthetic fiber and an outer coating of silicone elastomer particularly suited for providing thermal and electrical insulation for cables, cable connections and the like.

Insulation sleeving comprising a fiberglass braid inner sleeve and a coating of silicone elastomer is known. In the manufacture of such conventional insulation sleeving, a sleeve comprising a tubular braid of fiberglass yarn is initially prepared by means of a braiding machine. The tubular fiberglass braid or sleeve is then heat cleaned by subjecting it to a high temperature, to thereby singe or "heat shave" all of the fiberglass filaments which were broken during the braiding process. The fiberglass sleeve is then subjected to a caramelizing treatment carried out by passing the sleeve through an oven in which electrical resistors operate at high temperatures whereby the sizing of the fiberglass is eliminated to provide the sleeve with improved adhesion characteristics for the silicone elastomer coating to be applied. A coating of silicone elastomer is then applied over the surface of the tubular fiberglass braid. For example, in a continuous coating process, the braided fiberglass sleeve passes through an extruder head into which the silicone elastomer coating material is injected. Finally, the coated sleeve is passed through a curing oven operating at high temperatures where the silicone elastomer reticulates to thereby obtain the insulation sleeving.

Although conventional insulation sleevings provide excellent thermal and electrical insulation properties, as well as good mechanical protection in certain applications, there are certain limitations to which such sleevings are subject. For example, conventional insulation sleevings are substantially non-expansible in the radial direction, i.e., it is not possible to significantly increase the diameter of conventional insulation sleeving. For this reason, it is necessary for a manufacturer to produce and stock insulation sleevings having different diameters for different applications. For example, inventory must be maintained of insulation sleevings having about a 1.0 inch diameter for fitting 1.0 inch diameter cable, about a 1.5 inch diameter for fitting 1.5 inch diameter cable, about a 2.0 inch diameter for fitting 2.0 inch diameter cable, etc. This of course is costly and requires allocation of substantial capital to inventory.

Furthermore, conventional insulation sleeving cannot be used in applications that involve abrupt and considerable changes in cross section of the region to be insulated such, for example, as in the case of electrical connections. For such applications, it has been the practice to apply heat shrinkable tubings over the connections whereupon heat is applied to shrink the tubing onto the connection. However, the insulation provided by such that shrinkable tubings is less effective from the standpoint of mechanical protection, among others, than insulation sleeving formed of silicone elastomer-coated fiberglass braid due, among other things, to the omission of the fiberglass braid.

SUMMARY OF THE INVENTION

Accordingly, it is an object of the present invention to provide new and improved insulation sleeving and methods for manufacturing the same.

Another object of the present invention is to provide new and improved insulation sleeving which is substantially expansible in the radial direction so that the diameter thereof can be significantly increased.

Still another object of the present invention is to provide new and improved insulation sleeving having a certain uniform diameter which is useful in insulating any uniform cross-section object, e.g. a cable, even where the diameter of the object is up to about twice the unexpanded diameter of the insulation sleeving.

A further object of the present invention is to provide new and improved insulation sleeving useful for insulation regions containing abrupt and considerable changes in diameter, such as cable connectors.

A further object of the present invention is to provide new and improved insulation sleeving which provides improved thermal insulation.

Briefly, in accordance with the present invention, these and other objects are attained by providing insulation sleeving comprising an inner sleeve of woven synthetic organic or inorganic fiber and an outer coating of a silicone elastomer, wherein the fabric of the inner sleeve has a very open weave as compared to the weaves of the inner woven fabric sleeves as used in conventional insulation sleeving, while the silicone elastomer of the outer coating has a reduced modulus of elasticity and an increased tear strength relative to the silicone elastomer of the outer coating used in conventional insulation sleeving.

In particular, the number of picks per centimeter of the inner synthetic organic fiber weave is in the range of between about 2 and 9. The modulus of the elasticity of the silicone elastomer is in the range of between about 0.5 and 3.5 MPa (megapascals) at 100 percent elongation and the tear strength of the silicone elastomer is in the range of between about 5 and 45 KN/m Kilonewtons/meter.

Insulation sleeving constructed in accordance with the invention have the same excellent thermal and electrical insulation properties as conventional insulation sleeving while at the same time have the ability to elastically expand diametrically thereby enabling a sleeving having an unexpanded diameter of a certain dimension to be used in insulating objects having diameters of dimensions which may range from about that unexpanded diameter to about twice that dimension. Moreover, the insulation sleeving effectively adapts to changes in diameter so as to be useful in insulating regions having abrupt changes in cross-section without the application of heat as is necessary in the use of heat shrink tubings.

According to the method of the invention, insulation sleeving is manufactured by initially producing a tubular braid of woven synthetic organic or inorganic fiber having a number of picks per centimeter in the range of between about 2 and 9, and then heat cleaning and caramelizing the same in the conventional manner. A silicone elastomer is then selected for the outer coating having a modulus of elasticity in the range of between about 0.5 and 3.5 MPa at 100 percent elongation and a tear strength in the range of between about 5 and 45 KNm. The silicone elastomer is applied over the surface of the inner woven sleeve in the conventional manner to obtain the insulation sleeving. In this connection, it is noted that while not absolutely essential, a caramelizing step si advisable in that the elimination of the sizing provides the sleeving with improved adhesion characteristics for the silicone elastomer and thereby produces an increase in its elasticity, i.e., its "spring effect".

The radial expandability and elasticity of the insulation sleeving of the invention are the result of three coincident factors, namely, the use of a woven fabric for the inner sleeve having a suitable open weave as described above, the use of a particular silicone elastomer having a low modulus of elasticity and a high tear strength, and the adhesion between the organic fibers and the silicone elastomer.

The insulation sleeving of the invention thus combines the excellent thermal, electrical and mechanical insulating properties of conventional insulation sleeving and the adaptability of heat shrinkable tubings to discontinuous cross-section regions without the necessity for applying heat. It eliminates the need to stock a multitude of sizes of insulation sleeving to accommodate different size objects requiring only a few standard sizes to insulate a wide range of cable diameters.

DESCRIPTION OF THE DRAWINGS

A more complete appreciation of the present invention and many of the attendant advantages thereof will be readily understood by reference to the following detailed description when considered in connection with the accompanying drawings in which.

DETAILED DESCRIPTION OF THE PREFERRED EMBODIMENTS

Figure 1:
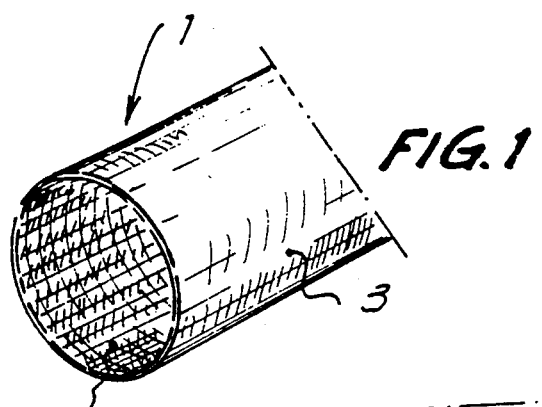
FIG. 1 is a partial perspective view of insulation sleeving in accordance with the invention.
Figure 2:
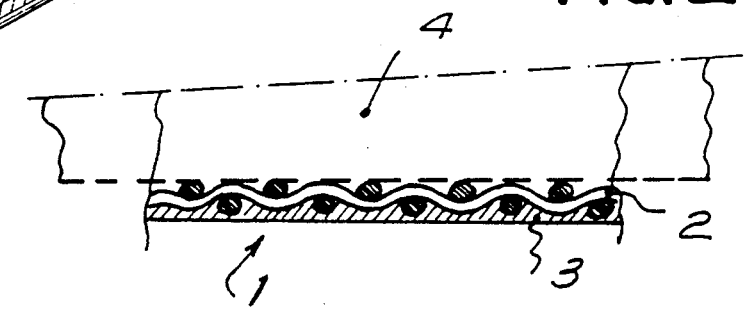
FIG. 2 is a section view of insulation in accordance with the invention.

Referring now to the drawings wherein like reference characters designate identical or corresponding parts throughout the several views, and more particularly to FIGS. 1 and 2, insulation sleeving constructed in accordance with the invention is generally designated 1 and comprises an inner sleeve 2 formed of braided fiberglass yarn and an outer coating 3 of silicone elastomer. The fiberglass braid forming the inner sleeve 2 in accordance with the invention has a picks per centimeter in the range of between 2 and 9, for example, 5. The silicone elastomer has a modulus of elasticity in the range of between about 0.5 and 3.5 MPa at 100 percent elongation, for example 2.0 MPa, and a tear strength in the range of between about 5 and 45 KN/m, for example, 30 KN/m.

The particular value of the picks per centimeter of the fiberglass braid depends to some extent on the diameter of the sleeving. In particular, a larger diameter sleeving generally implies a value for the picks per centimeter in the upper end of the specified range.

Insulation sleeving constructed in accordance with the invention provides excellent thermal, electrical and mechanical insulation characteristics. Generally, the dielectric strength of such insulation sleeving is in the range of between about 15 and 25 KV/mm (kilovolts/-millimeter). The hardness of the insulation sleeving generally is in teh range of between about 3 to 65 Shore A. Flame resistance of insulation sleeving in accordance with the invention is generally rated at UL 1441 VW-1.

Figure 3:
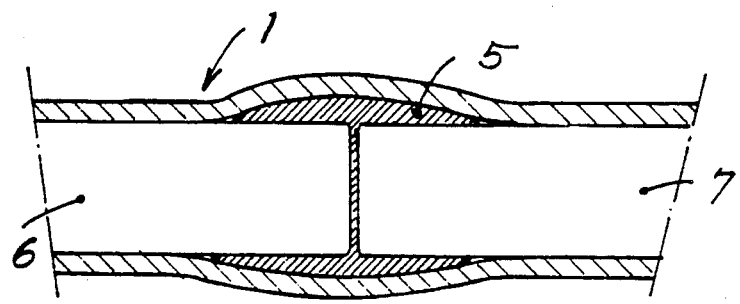
FIG. 3 is a section view illustrating the application of insulation sleeving according tot eh invention tot he region of a welded joint between a pair of cables.

As seen in FIG. 2, due to the radial expandability and elasticity of insulation sleeving 1, the same can be applied over a jacketed object 4 having a gradually changing diameter. Referring to FIG. 3, the insulation sleeving 1 is shown applied to a welded joint 5 joining a pair of cables 6 and 7, the region of the joint presenting a change in diameter which can be accommodated due to the radial expandability and elasticity of the insulation sleeving.

Figures 4, 5:
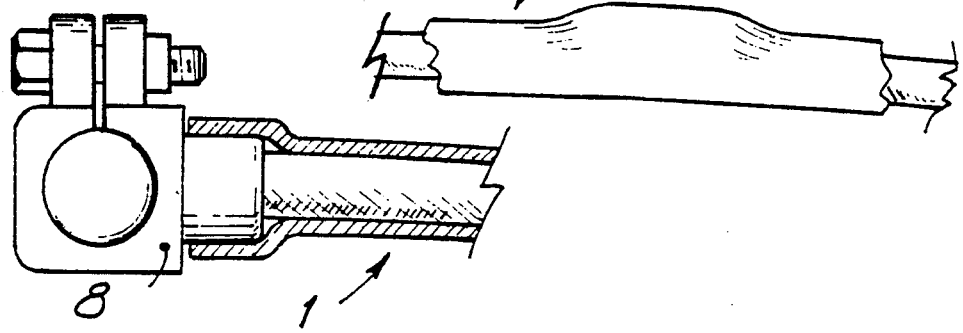
FIG. 4 is a section view illustrating the application of insulation sleeving according to the invention to a cable connection.
FiG. 5 is a side view illustrating the application of insulation sleeving according to the invention to a region comprising an abrupt change in cross-section.

Referring to FIG. 4, insulation sleeving 1 is illustrated as applied to a cable connection 8 comprising an abrupt change in diameter. It is seen from FIG. 4 that the insulation sleeving 1 adapts itself to the abrupt discontinuity in the cross-section of the connection 8. In a similar manner, FIG. 5 illustrates the insulation sleeving 1 provided over a region of an object at which an abrupt change in diameter exists. It is there seen that the insulation sleeving 1 adapts or follows the profile of the object.

The elasticity of the insulation sleeving of the invention also results in improved thermal insulation properties, at least in cases where the insulation sleeving is applied over an object having a greater diameter than the unexpanded diameter of the sleeving. In such cases, the insulation sleeving tightly surrounds the object with a compression force thereby reducing air space between the sleeving and the object and consequently, improving thermal insulation.

The inner sleeve of the insulation sleeving may be formed of any suitable synthetic organic or inorganic fiber. For example, in addition to fiber glass, the inner sleeve may be formed from fibers of Kevlar, polyaramid, nylon, polyester and the like.

Obviously, numerous modifications and variations of the present invention are possible in the light of the above teachings. It is therefore to be understood that within the scope of the claims appended hereto, the invention may be varied from that specifically disclosed herein.

What is claimed is:

1. Insulating sleeving having a certain diameter in an unexpanded condition to be fitted over an object, to thermally and electrically insulate the object, comprising:

an inner sleeve of woven synthetic fiber wherein the number of picks per centimeter of the woven synthetic fiber is in the range of between about 2 and 9; and an outer coating formed of silicone elastomer having a reduced modulus of elasticity in range of between about 0.5 and 3.5 MPa (mega pascals) at 100 percent elongation and said silicone elastomer having a tear strength in the range of between about 5 and 45 KN/m (kilonewtons/meter), means to provide that the diameter of said insulation sleeving can be elastically expanded in the radial direction up to about twice said certain diameter.

2. Insulation sleeving as recited in claim 1 wherein said woven synthetic organic fiber of said inner sleeve comprises fiberglass braid.

* * * * *